United States Patent

[11] 3,530,937

| [72] | Inventor | George G. Bernard |
| | | La Mirada, California |
| [21] | Appl. No. | 780,819 |
| [22] | Filed | Dec. 3, 1968 |
| [45] | Patented | Sept. 29, 1970 |
| [73] | Assignee | Union Oil Company of California |
| | | Los Angeles, California |
| | | a corporation of California |

[54] METHOD FOR WATER FLOODING HETEROGENEOUS PETROLEUM RESERVOIRS
13 Claims, 1 Drawing Fig.

| [52] | U.S. Cl. | 166/270, 166/273, 166/292 |
| [51] | Int. Cl. | E21b 33/138, E21b 43/20, F21b 43/22 |
| [50] | Field of Search | 166/270, 273, 292, 285, 293—295, 300 |

[56] References Cited
UNITED STATES PATENTS

| 2,238,930 | 4/1941 | Chamberlain et al. | 166/292 |
| 2,272,672 | 2/1942 | Kennedy | 166/270 |
| 2,747,670 | 5/1956 | King et al. | 166/270 |
| 2,807,324 | 9/1957 | King et al. | 166/292 |
| 3,202,214 | 8/1965 | McLaughlin | 166/292 |
| 3,261,400 | 7/1966 | Elfrink | 166/292 |
| 3,285,338 | 11/1966 | Boston | 166/270 |
| 3,342,262 | 9/1967 | King et al. | 166/292 |
| 3,396,790 | 8/1968 | Eaton | 166/270 |

*Primary Examiner*—Stephen J. Novosad
*Attorneys*—Milton W. Lee, Richard C. Hartman, Lannas S. Henderson, Dean Sandford and Robert E. Strauss ABSTRACT: A method for water flooding heterogeneous petroleum reservoirs having strata of different permeabilities in which plugging precipitates are successively deposited in regions of the reservoir increasingly further from the injection well. The plugging precipitate is formed by the reaction of chemically reactive agents injected into the reservoir in aqueous solutions separated by an inert spacing medium, the amount of spacing medium being increased in each successive plugging treatment to cause the precipitate to be formed in a region of the reservoir increasingly further from the injection well.

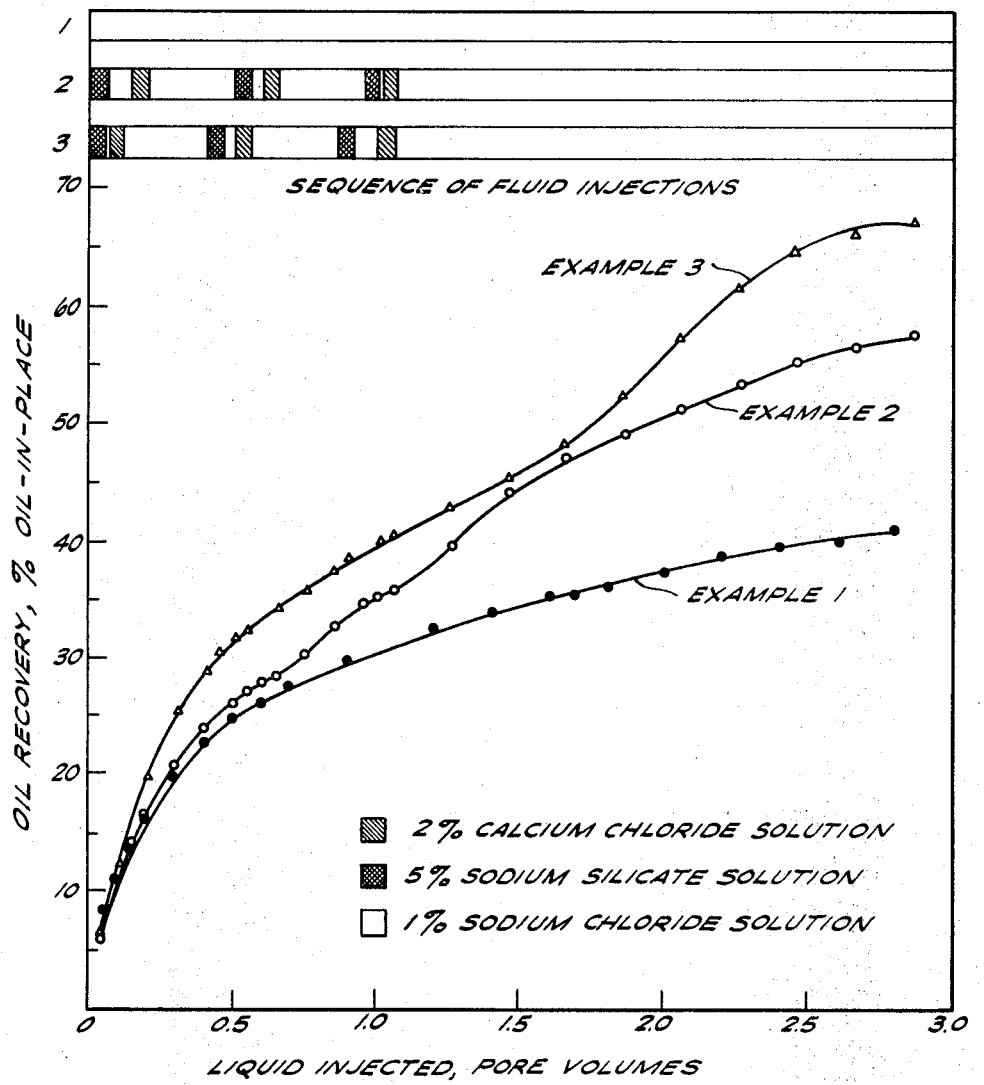

3,530,937

METHOD FOR WATER FLOODING HETEROGENEOUS PETROLEUM RESERVOIRS

This invention relates to the recovery of oil from subterranean petroleum reservoirs of varying permeability, and more particularly to a method of recovering oil from heterogeneous reservoirs by water flooding.

Since only a portion of the oil contained in a petroleum reservoir can be recovered by primary methods, it has become conventional practice to employ various secondary and tertiary recovery techniques to produce additional quantities of oil not economically recoverable by primary methods. Of the various secondary and tertiary recovery methods available, one of the most widely practiced techniques is the displacement of the oil from the reservoir with a displacement fluid injected for that purpose, such as commonly employed in water flooding. Normally, in carrying out the waterflooding process, a series of input wells approximately equidistant from a producing well are drilled into and opened to the same oil-producing strata. The injection well locations with reference to the production well are selected to afford a desired flood pattern, the selected pattern depending in part on field conditions, the location of existing wells, and the operator's preference. Aqueous displacement fluid, such as water, brine or viscous water, is forced into the input wells under pressure, and out into the surrounding oil-bearing strata towards the producing well or wells. While water flooding has been rather widely practiced in recent years, it is not without considerable operating problems and economic limitations, particularly those associated with low oil recoveries in proportion to the amount of water injected.

One of the major problems encountered in the water flooding operating is water breakthrough from the flood front to the producing well relatively early in the displacement process, and rapidly increasing producing water/oil ratios following this initial water breakthrough. These difficulties result from the aqueous displacing medium channeling or fingering through the oil-bearing structure to the producing well, thus bypassing large zones of the oil-bearing strata. While a uniform flood front with reduced fingering can be obtained with a displacement fluid rendered more viscous by the addition of various water-soluble polymers or other materials capable of imparting higher viscosity to the flood water, viscous water flooding alone is not fully effective in all formations. The reason for the lack of suitable recovery in these formations is due, in part, to the peculiar structure of the oil-bearing strata. Underground oil reservoirs, in most cases, consist of layers of sand or rock and, since no reservoir rock is perfectly uniform in composition and structure, the permeability will vary across the rock face or stratum. Also, fractures, cracks, vugs and other abnomalies can promote channeling of the displacement fluid.

In the normal flooding operation the ideal situation for maximum recovery of oil is obtained when the driven fluid is permitted to build up in a wide bank in front of the driving fluid which moves uniformly towards the producing well. To keep this bank of oil intact, and constantly moving towards the producing well, a substantially uniform permeability must exist throughout the strata. If this uniform permeability does not exist or is not provided, the flooding fluid will seek the areas of high permeability, and channeling occurs with the consequent loss of some driving fluid energy and appearance of excess displacement fluid in the producing well. Moreover, as the more permeable strata are depleted, the water has a tendency to follow channels and further increase consumption of flooding water to the point where the process becomes economically undesirable. This maximum limit, in terms of recovered oil, can be as high as 100 barrels of driving fluid per barrel of oil. It is of course desirable to operate at much lower water to oil ratios, and normally five to 10 barrels of water per barrel of recovered oil is considered an acceptable operating condition.

More uniform flood fronts can be obtained in formations of non-uniform permeability by control or adjustment of the permeability of the more permeable strata of the formation in the flood zone. A number of methods of reducing the permeability of these permeable strata have been proposed, including the injection of plugging materials into these strata to at least partially plug the permeable zones so as to achieve more uniform permeability. Some of these methods of permeability adjustment accomplish the plugging step by the in situ information of plugging material in the permeable strata by injecting one or more reactant substances which chemically react to form a solid residue. The reactant substance can react with a substance naturally occurring in the structure, or with a second reactant material injected for that purpose. These reactant substances include various hydraulic cements, precipitate forming materials, and monomers or prepolymers which are polymerizable under formation conditions.

As an example of these plugging materials, U.S. Pat. No. 2,272,672 discloses the injection of solutions which on introduction into the permeable strata react to produce a precipitate that obstructs the pores and provides limited control of porosity. Similarly, U.S. Pat. No. 2,238,930 discloses a method of sealing the pores of earth strata utilizing a solution of a metal compound capable of forming an insoluble precipitate when the solution is brought into contact with the formation; a stabilizing agent being employed to prevent premature precipitation. U.S. Pat. Nos. 2,747,670 and 2,807,324 disclose the injection of reactants which react on contact in the formation to form single and double precipitates. In both of these methods, the reactant materials in aqueous solution are separately injected, these solutions being separated by an inert spacer fluid. The volume of inert spacer fluid is adjusted to control the theoretical point within the formation at which the precipitation reaction occurs, and at which point the plug will be formed. Thus, by proper control of the volume of inert spacer fluid, it is theoretically possible to obtain a controlled selective plugging, or adjustment of permeability, at a specific desired distance from the well in a manner that provides a smooth uniform permeability profile throughout the entire area surrounding the input well.

While the foregoing methods of permeability control in a water flooding operation are in many instances sufficiently effective to produce an increase in oil recovery, many reservoirs completely fail to respond to treatment and the incremental oil recovery in others is undesirably small. Further, even with the most successful of the prior art selective plugging treatments, oil recoveries are far from complete. One reason for the low oil recoveries obtained by many of the proposed treating methods is that permeability adjustment is obtained in only a limited section of the reservoir, and channeling of the flooding medium is encountered elsewhere in the formation. For example, in our commonly encountered situation, strata of high and low permeability are located adjacent to each other. A permeability adjustment can be made by depositing a plugging precipitate on the more permeable zone at a point removed from the well. However, while the flooding medium may be uniformly distributed prior to passing the plugged section, channeling from the low to the high permeability strata is encountered at a point more removed from the injection well because of cross-flow between the communicating strata. Although this problem can be somewhat overcome by the method disclosed in U.S. Pat. No. 3,342,262 in which plugging reactants are injected in small slugs separated by inert spacer liquid and the amount of spacer liquid in each successive cycle decreased so that the plugging material is deposited in concentric rings increasingly approaching the injection well, this method is not wholly satisfactory as additional quantities of oil remain unrecovered.

Accordingly, a principal object of this invention is to provide an improved process for recovering oil from heterogeneous petroleum reservoirs. Another object of the invention is to provide an improved water flooding process in which the displacement fluid pattern is controlled by selectively plugging the more permeable water channels. A further object is to provide a method for waterflooding a reservoir having strata of different permeabilities in which the cross-flow between adjacent permeable strata is minimized. Other objects and advantages of the invention will be apparent from the following description.

Briefly, this invention contemplates an improved waterflooding process for recovering oil from heterogeneous petroleum reservoirs having strata of different permeabilities which plugging precipitates are successively formed in regions of the reservoir progressively further from the injection well. Each plugging treatment is carried out by successively injecting two aqueous solutions, each containing a chemically reactive agent that is adapted to react with the agent in the other solution to form a plugging precipitate when brought into contact with each other in the reservoir. The reactant solutions are maintained separated during injection by an inert spacer liquid injected between the reactant slugs, the amount of spacer liquid being increased in each successive plugging treatment to cause the precipitate to be formed in a region of the reservoir progressively further from the injection well.

With the heretofore conventional methods of permeability adjustment within a formation employing successive plugging treatments, the same amount of spacing medium is employed between reactant solutions injected in successive plugging treatments, or alternatively, the amount of spacing medium is decreased in each successive treatment to cause the resulting precipitate to be deposited in a region of the formation increasingly closer to the injection well.

The superiority of the method of this invention as compared with the prior art flooding processes is illustrated in the drawing which graphically compares the oil recovery obtained from a model of a heterogeneous reservoir as a function of the volume of fluid injected (1) for a conventional water flood, (2) for a water flood employing a prior art selective plugging technique, and (3) for a water flood employing the selective plugging treatment of this invention. These data are obtained from the laboratory tests described in examples 1, 2 and 3, which follow.

In the practice of the method of this invention, an aqueous solution of a first chemically reactive agent is injected into the reservoir through an injection well and followed sequentially by the injection of a quantity of inert spacing medium and an aqueous solution of a second chemically reactive agent which reacts with the first agent on contact in the reservoir to form a precipitate. Preferably, the type and amount of precipitate formed is selected to partially but not completely obstruct the pores of the more permeable zones of the reservoir. Aqueous flooding medium is injected to displace the previously injected fluids through the reservoir towards one or more spaced production wells completed in the reservoir. After a quantity of aqueous flooding medium has been injected, the flooding medium injection is interrupted and an additional plugging treatment performed by sequentially injecting a quantity of first reactant solution, an inert spacing medium, and a quantity of second reactant solution. The amount of inert spacing medium injected in this plugging treatment is increased over that employed in the first treatment. The injection of flooding medium is then resumed and the flooding operation continued. Additional plugging treatments can be performed as required by injecting further quantities of the reactant solutions separated by inert spacing medium, the amount of spacing medium being increased in each successive treatment, as will be hereinafter more fully described.

The fluids injected in the foregoing manner preferentially enter the more permeable strata of the formation and pass outwardly from the injection well through these strata. At some region of the formation removed from the injection well, depending on the amount of spacing fluid employed and the degree of fingering encountered, the reactant solutions will come into contact and plugging precipitate will be produced. As the precipitate is formed, plugging occurs and the subsequently injected fluids are diverted into other of the permeable strata. However, as fluid injection is continued, the injected fluids tend to reenter the more permeable of the strata at a point beyond the plugged region due to cross-flow between the various strata. Accordingly, the plug remains effective for only a limited portion of the flooding operation, necessitating subsequent plugging treatments. It is believed that in the flooding method of this invention, the precipitate formed by subsequent plugging treatments is deposited in regions of the formation further removed from the injection well, thereby continuing the diversion of the flooding medium into the less permeable strata and displacing oil from strata that would not otherwise be contacted by the flooding medium. Although the exact mechanism by which the oil recovery is increased is not understood with certainty, it has nevertheless been demonstrated that substantially more oil is recovered by the method of this invention than by prior art flooding methods.

A wide variety of water-soluble reactants can be used in the practice of this invention. For example, water-soluble salts of certain metals and an alkaline substance produce insoluble precipitates. Suitable water-soluble salts include the salts of iron, aluminum, calcium, cobalt, nickel, copper, mercury, silver, lead, chromium, zinc, cadmium and magnesium. The water-soluble salts of these metals produce a precipitate of a basic metal compound when brought into contact with an alkaline solution. Exemplary of the alkaline solutions are aqueous solutions of sodium hydroxide, sodium carbonate, sodium borate, sodium silicate, sodium phosphate, or the potassium or ammonium salts of these anions.

In selecting the particular reactants to be used, some consideration of the type of precipitate desired is necessary. Generally, it is desirable to produce a gelatinous type of precipitate which will form an insoluble precipitate adherent to the pore walls. Such a precipitate is advantageous in view of the relatively high pressures existing on the driving fluid which in turn will be exerted against the precipitate. While a wide variety of compounds can be used to effectively carry out this method, consideration should be given to the selection of the reactants with respect to the strata in which the desired precipitate is expected to be formed, as it is well known certain types of strata contain various mineral substances which are capable of reacting with chemical solutions to form precipitates. In addition, the naturally existing brines also contain mineral substances capable of reacting with certain chemical solutions to form precipitates. To avoid such occurrences, care should be taken to select as the reactant components those chemicals which will be inert to the surrounding strata on introduction into the well. Also, in some applications it may be desirable to employ reactants that form a double precipitate on being brought into contact in a subterranean formation. By double precipitate it is meant that both of the products of the reaction are substantially insoluble and act to plug the formation.

Although any water soluble reactive chemicals that react to yield a solid precipitate under formation conditions, such as the aforementioned metal salts and alkaline substances, can be employed in the practice of this invention, certain reactant substances have proven particularly successful. One reactant combination useful in many applications is sodium carbonate and ferric chloride. Another reactant combination known to form a double precipitate is sodium silicate and ferrous sulfate. A particularly preferred reactant combination is sodium silicate and calcium chloride.

Accordingly, in a preferred embodiment of this invention, selective partial plugging is accomplished by injection of a first aqueous reactant solution containing 5 to 20 percent by weight sodium carbonate. This solution is followed by an inert spacer fluid and then by a second reactant fluid comprising an aqueous solution of 5 to 30 percent by weight ferric chloride.

In another preferred embodiment, the first reactive fluid comprises an aqueous solution containing 1 to 25 percent by weight sodium silicate, and the second reactant solution comprises a 5 percent by weight to saturated solution (about 13 percent by weight) of ferrous sulfate.

In still another preferred embodiment, the first reactive fluid comprises an aqueous solution containing 1 to 25 percent by weight sodium silicate, and the second reactant solution comprises a 1 to 10 percent by weight solution of calcium chloride.

Preferably, an amount of chemical reactants is employed which, upon reaction in the formation, forms sufficient precipitate to partially, but not completely, plug the more permeable zones of the formation. Also, it is preferred that the reactants injected in each stage, be employed in substantially stoichiometric quantities. Thus, in each plugging treatment, the reactants are injected in chemically equivalent amounts.

The flooding medium used to displace the reactant chemicals into the formation and to drive oil towards the spaced producing wells can be water or brine, and can contain a thickening agent such as a water-soluble polymer having the effect of reducing its mobility in the porous structure. Water can be conveniently employed as spacer fluid to maintain the reactant chemicals spaced apart to avoid premature reaction. Also, brine and other aqueous solutions can be employed for this purpose providing that they do not react with the reactant chemicals to cause premature precipitation.

Although the ultimate test of the success of a flooding operation is the amount of oil recovered with respect to the amount contained in the reservoir, some indication of the effectiveness of the flood can be ascertained by certain observations made during the course of the flooding operation. For instance, the length of time required for oil production to begin after starting flood water injection, and the time required for the flood water to break through into the producing wells are indications of the success of the operation, longer times being regarded as an indication of a successful operation. Also, tracer tests can be employed to indicate channelling of flood water to the producing well which is indicative of a reduction in sweep efficiency. Also, the progress of the flooding operation can be monitored by observing variations in the ratio of water to oil produced from individual producing wells.

Accordingly, in one mode of practicing the invention, a water flood operation is commenced in conventional manner by injecting aqueous flooding medium into one or more injection wells and recovering oil from one or more spaced producing wells arranged in a suitable pattern. The flooding operation is monitored until there is an indication that the flooding operation is unsatisfactory, whereupon a first plugging treatment is conducted as hereinabove described. The injection of flooding medium is then resumed and continued until a second selective plugging treatment becomes necessary. The amount of inert spacer fluid injected between the reactant solutions in the second treatment is increased over that employed in the first treatment so that the reactants will come into contact in a region of the reservoir further removed from the injection well than did those in the first treatment. Flooding medium injection is again resumed. Further plugging treatments can be performed as necessary, with each successive plugging treatment being made so that the precipitate is deposited in a region of the reservoir increasingly further removed from the injection well.

In another mode of practicing the invention, the selective plugging treatments are performed at substantially fixed intervals during the flooding operation. Thus, in this embodiment of the invention, a first selective plugging treatment is performed early in the flooding operation, followed by subsequent treatments at later stages of the operations. The amount of inert spacer fluid employed in each subsequent plugging treatment is increased over that in the preceding treatment to effect deposition of the precipitate in a region of the reservoir increasingly further from the injection well.

It has been found that improved oil recovery can be obtained in many applications with a water flooding process in which a first plugging treatment is made so as to deposit the plugging precipitate in the reservoir at a distance from the injection well equivalent to about 1 to 10 percent of the distance between the injection well and the nearest producing well. Thereafter, a second plugging treatment is made so that the plugging precipitate is deposited at a distance from the injection well equivalent to about 10 to 40 percent of the distance between the injection and nearest producing well. Subsequently, a third plugging treatment is made so that the plugging precipitate is deposited at a distance from the injection well equivalent to about 40 to 60 percent of the distance between the wells. The flooding operation is then continued until completion, which may be evidenced by the producing water/oil ratio increasing to the point that oil can no longer be economically produced.

In a specific application, the first plugging treatment is made so that the plugging precipitate is deposited about one-thirtieth of the distance between the injection well and the nearest producing well, the second about one-third of this distance, and the third about one-half thereof.

The volume of spacer liquid required to maintain the two reactant solutions separated until they have reached any preselected region of the formation can be estimated from conventional theoretical considerations, such as by the technique disclosed in U.S. Pat. No. 2,747,670. Also, in many applications, satisfactory results are obtained by a treating program in which the volume of spacer fluid employed in the first treating stage is equivalent to 0.5 to 1.5 barrels of fluid per vertical foot of formation to be treated, and volume of spacer fluid employed in each successive plugging treatment is substantially uniformly increased by an amount equivalent to the volume employed in the first treating stage. Thus, in a case where 1.0 barrels of treating fluid per foot of formation is injected in the first stage, approximately 2.0 barrels per foot is employed in the second stage, 3.0 barrels per foot in the third stage, etc.

As more fully disclosed in U.S. Pat. No. 3,396,790, superior results can be obtained in many applications by adding a viscosity increasing agent to the first injected of the aqueous reactant solutions to increase its viscosity substantially above that of the subsequently injected spacing fluid and second reactant solution, thereby promoting fingering of the subsequently injected fluids into the first reactant solution.

Further, it is to be understood that additional agents, such as bacteriocides and corrosion inhibitors, can be incorporated into the fluids injected into a subterranean formation in the practice of this invention.

The improved oil recovery method of this invention is demonstrated by the following examples which are presented by way of illustration, and which are not intended as limiting the spirit or scope of the invention as defined by the appended claims.

EXAMPLE 1

The recovery of oil from a heterogeneous reservoir by conventional water flooding is demonstrated by the following test flood of a model simulating a heterogeneous reservoir having strata of different permeabilities and which is susceptible to cross-flow between the strata. The model is comprised of two parallel pipes 1½-inches in diameter by 10 feet long, interconnected by five ¼-inch nipples to provide cross-flow between the pipes. One of the pipes is packed with Del Monte 30 sand and the other pipe with Nevada 30 sand. The sand packs are saturated with brine containing 1 weight percent dissolved salts and then with oil having a viscosity of 28 cp. at 70°F. The Del Monte sand pack exhibited a permeability of 27.2 darcies and the Nevada sand pack exhibited a permeability of 5.5 darcies. Thus, the model simulates a reservoir system wherein adjacent strata have a five-fold difference in permeability, and wherein the possibility of cross-flow between adjacent strata exists.

The flooding operation is conducted by separately injecting brine into each of the sand packs at an injection pressure of 30 p.s.i.g. Produced fluids are recovered and the respective amounts of oil and water measured. A total of 42.4 percent of the initial oil-in-place is recovered by injecting 3.0 pore volumes of brine. The results of this test are summarized in table 2.

EXAMPLE 2

The effectiveness of the prior art method of selectively plugging a heterogeneous reservoir is demonstrated by this test conducted on the model described in example 1. The oil saturated sand pack is flooded by injecting 0.05 pore volume of a 2 percent aqueous solution of sodium silicate and 0.05 pore volume of a 2 percent aqueous solution of calcium chloride separated by 0.10 pore volume of brine. These agents are displaced into the sand packs by the injection of 0.30 pore volume of brine. Upon completing the brine injection, 0.05 pore volume each of sodium silicate solution and calcium chloride solution are injected, these agents being separated by a 0.05 pore volume slug of brine. Again, the reactive agents are displaced into the sand pack by the injection of 0.30 pore volumes of brine. The plugging step is repeated a third time with the reactive agents being separated by only 0.01 pore volume of the inert spacer liquid. The flooding operation is then completed by the injection of brine. The various fluid injections are summarized in table 1.

A total of 59.0 percent of the initial oil-in-place is recovered by the injection of 3.06 cumulative pore volumes of fluid. The results of this test are listed in table 2.

EXAMPLE 3

The oil recovery method of this invention is demonstrated by this test. The model is prepared and saturated with oil as described in example 1. The flooding operation is conducted by first injecting 0.05 pore volume of an aqueous 2 percent solution of sodium silicate and 0.05 pore volume of an aqueous 2 percent solution of calcium chloride separated by 0.01 pore volume of brine. These agents are displaced into the sand packs by injecting 0.30 pore volume of brine. Next, 0.05 pore volume each of sodium silicate solution and calcium chloride solution are injected, these agents being separated by 0.05 pore volume of brine. Again the reactive agents are displaced into the sand pack by the injection of 0.30 pore volumes of brine. The plugging step is repeated a third time with the reactive agents being separated by 0.10 pore volume of inert spacer liquid, and the flooding operation completed by the injection of brine. The various fluid injections are summarized in table 1.

A total of 68.8 percent of the initial oil-in-place is recovered by the injection of 3.06 cumulative pore volumes of fluid. The results of this test are reported in table 2.

The sequence in which these fluids are injected is graphically illustrated at the top of the drawing. The injection pattern in test nos. 2 and 3 are similar with the exception of the amount of spacer liquid injected between the reactive plugging agents. In test no. 2, 0.10 pore volume of spacer liquid is injected between the first reactants, 0.05 pore volume between the second, and only 0.01 pore volume between the last reactants. Thus, the precipitate formed by the reaction of each successive group of reactants is deposited in the sand pack progressively closer to the inlet. In test no. 3, the initial reactants are separated by only 0.01 pore volume of spacer liquid, the second reactants by 0.05 pore volume, and the last reactants by 0.10 pore volume. In this test, the plugging precipitate is deposited in the sand pack at a point progressively more removed from the well.

TABLE 2

| Test No. 1 | | Test No. 2 | | Test No. 3 | |
|---|---|---|---|---|---|
| Cumulative fluid injected, pore vol. | Oil recovery, percent OIP | Cumulative fluid injected, pore vol. | Oil recovery, percent OIP | Cumulative fluid injected, pore vol. | Oil recovery, percent OIP |
| .06 | 8.2 | .05 | 5.8 | .05 | 6.1 |
| .10 | 10.8 | .15 | 14.3 | .06 | 7.3 |
| .20 | 16.2 | .20 | 16.9 | .11 | 12.5 |
| .30 | 19.8 | .30 | 20.8 | .21 | 19.8 |
| .40 | 22.6 | .40 | 24.0 | .31 | 25.7 |
| .50 | 24.6 | .50 | 26.2 | .41 | 29.1 |
| .60 | 26.2 | .55 | 27.1 | .46 | 30.5 |
| .70 | 27.6 | .60 | 27.9 | .51 | 31.4 |
| .80 | 28.7 | .65 | 28.6 | .56 | 32.4 |
| .90 | 29.9 | .75 | 30.1 | .66 | 34.2 |
| 1.0 | 30.8 | .85 | 32.8 | .76 | 35.8 |
| 1.2 | 32.5 | .95 | 34.8 | .86 | 37.5 |
| 1.4 | 34.0 | 1.00 | 35.3 | .91 | 38.5 |
| 1.6 | 35.5 | 1.01 | 35.4 | 1.01 | 40.0 |
| 1.8 | 36.7 | 1.06 | 36.1 | 1.26 | 43.1 |
| 2.0 | 37.6 | 1.26 | 39.7 | 1.46 | 45.5 |
| 2.2 | 38.9 | 1.46 | 44.6 | 1.66 | 48.5 |
| 2.4 | 39.9 | 1.66 | 47.1 | 1.86 | 52.5 |
| 2.6 | 40.7 | 1.86 | 49.4 | 2.06 | 58.5 |
| 2.8 | 41.6 | 2.06 | 51.4 | 2.26 | 62.1 |
| 3.0 | 42.4 | 2.26 | 53.6 | 2.46 | 65.0 |
| | | 2.46 | 55.8 | 2.66 | 66.5 |
| | | 2.66 | 57.0 | 2.86 | 67.7 |
| | | 2.86 | 58.0 | 3.06 | 68.8 |
| | | 3.06 | 59.0 | | |

It is apparent from the foregoing that injection of the reactive agents so as to form the plugging precipitate at locations in the reservoir progressively more removed from the injection well results in higher oil recovery than the prior art technique of depositing the precipitate progressively closer to the injection well.

EXAMPLE 4

A water flooding operation in accordance with the method of this invention is conducted on an oil reservoir depleted to the minimum economic production rate by primary recovery. The wells are arranged in a square pattern with a spacing of about 300 feet. A number of the wells are converted to injection wells so as to provide a 5-spot pattern with four injection wells surrounding a central producing well. The producing

TABLE 1.—SUMMARY OF FLUID[1] INJECTIONS

| Test No. 1 | | Test No. 2 | | Test No. 3 | |
|---|---|---|---|---|---|
| Pore volume | Fluid | Pore volume | Fluid | Pore volume | Fluid |
| 3.0 | Brine | 0.05 | Sodium silicate | 0.05 | Sodium silicate. |
| | | 0.10 | Brine | 0.01 | Brine. |
| | | 0.05 | Calcium chloride | 0.05 | Calcium chloride. |
| | | 0.30 | Brine | 0.30 | Brine. |
| | | 0.05 | Sodium silicate | 0.05 | Sodium silicate. |
| | | 0.05 | Brine | 0.05 | Brine. |
| | | 0.05 | Calcium chloride | 0.05 | Calcium chloride. |
| | | 0.30 | Brine | 0.30 | Brine. |
| | | 0.05 | Sodium silicate | 0.05 | Sodium silicate. |
| | | 0.01 | Brine | 0.10 | Brine. |
| | | 0.05 | Calcium chloride | 0.05 | Calcium chloride |
| | | 2.00 | Brine | 2.00 | Brine. |

[1] Fluid compositions:
Brine, 1% aqueous solution of sodium chloride.
Sodium silicate, 2% aqueous solution of sodium silicate.
Calcium chloride, 2% aqueous solution of calcium chloride.

formation is highly stratified with different stratas exhibiting as much as a ten-fold difference in permeability.

The flooding operation is started by initially injecting flood water to establish the injectivity profile and the required injection pressure. The plugging treatment program is then carried out to deposit plugging precipitates in the formation at a distance from the injection well equivalent to about one-thirtieth, one-third and one-half of the distance between the injection and producing wells. Thus, it is desired that the plugging precipitate be deposited at a distance of about 10, 100 and 150 feet from the injection wells. In accordance with this plugging treatment program, the following injections are made into each of the water injection wells:

| | Fluid injected | Volume, bbls./ ft.[1] |
|---|---|---|
| 1st Stage | Sodium silicate solution [2] | 6.2 |
| | Water | 0.9 |
| | Calcium chloride solution [3] | 6.2 |
| | Flood water | 8.0 |
| 2nd Stage | Sodium silicate solution [2] | 6.2 |
| | Water | 1.6 |
| | Calcium chloride solution [3] | 6.2 |
| | Flood water | 8.0 |
| 3rd Stage | Sodium silicate solution [2] | 6.2 |
| | Water | 2.4 |
| | Calcium chloride solution [3] | 6.2 |

[1] Barrels of liquid per foot of vertical thickness of formation to be treated.
[2] Aqueous 2 weight percent sodium silicate solution.
[3] Aqueous 2 weight percent calcium chloride solution.

Upon completion of the plugging treatment, flood water is injected into the injection wells and oil recovered from the producing wells until the producing water/oil ratios increase sufficiently to render the operation no longer economically attractive.

While particular embodiments of the invention have been described, it will be understood, of course, that the invention is not limited thereto since many modifications can be made, and it is intended to include within the invention any such modifications and embodiments as fall within the scope of the claims.

I claim:

1. In the method of recovering oil from subterranean reservoirs in which a displacing medium is injected into the reservoir through an injection well and oil is recovered from a production well spaced apart in the reservoir from the injection well, and wherein the permeability of the reservoir is adjusted by a plurality of successive plugging treatments in which aqueous solutions of precipitate-forming reactants that react on contact in the formation are introduced into the reservoir separated by an inert spacing medium, the improvement which comprises increasing the volume of spacing medium in each successive plugging treatment so that the plugging precipitate is successively formed in regions of the reservoir increasingly further from the injection well.

2. The method defined in claim 1 wherein a first plugging precipitate is deposited in the reservoir at a distance of about 1 to 10 percent of the distance between the injection well and the nearest producing well, a second plugging precipitate is deposited at a distance of about 10 to 40 percent of the distance between said wells, and a third plugging precipitate is deposited at a distance of about 40 to 60 percent of said distance.

3. The method defined in claim 1 wherein a first plugging precipitate is deposited in the reservoir at about one-thirtieth of the distance between the injection well and the nearest producing well, a second plugging precipitate at about one-third of the distance between said wells, and a third plugging precipitate at about one-half of said distance.

4. The method defined in claim 1 in which the volume of spacing liquid employed in the first treating stage is equivalent to 0.5 to 1.5 barrels of fluid per vertical foot of formation to be treated.

5. The method defined in claim 1 in which the volume of spacing medium in each successive plugging treatment is substantially uniformly increased by an amount equivalent to the volume of spacing medium employed in the first treating stage.

6. The method defined in claim 1 wherein the precipitate-forming reactants are sodium silicate and calcium chloride.

7. A method for recovering oil from heterogeneous oil-bearing formations penetrated by an injection well and a spaced production well, which comprises:
   adjusting the permeability of the formation by introducing into the formation through said injection well in sequence;
   a. an aqueous solution of a first reactant material;
   b. an inert spacing medium;
   c. an aqueous solution of a second reactant material that reacts with said first reactant material on contact in the formation to produce a plugging precipitate;
   injecting an aqueous flooding medium into the formation through said injection well to displace said reactants into the formation;
   interrupting the injection of flooding medium and repeating the foregoing steps to obtain a plurality of permeability adjustments, the inert spacing medium being increased in volume in each successive treatment so that the plugging precipitate is successively formed in regions of the reservoir increasingly further from the injection well;
   continuing the injection of aqueous flooding medium; and
   recovering oil from said production well.

8. The method defined in claim 7 wherein three permeability adjustments depositing plugging precipitates in the formation are performed, the first plugging precipitate being deposited at a distance of about 1 to 10 percent of the distance between the injection well and the nearest producing well, a second plugging precipitate being deposited at a distance of about 10 to 40 percent of the distance between said wells, and a third plugging precipitate being deposited at a distance of about 40 to 60 percent of said distance.

9. The method defined in claim 7 wherein three permeability adjustments depositing plugging precipitates in the formation are performed, the first plugging precipitate being deposited in the reservoir at about one-thirtieth of the distance between the injection well and the nearest producing well, a second plugging precipitate at about one-third of the distance between said wells, and a third plugging precipitate at about one-half of said distance.

10. The method defined in claim 7 wherein the column of spacing medium employed in the first treating stage is equivalent to 0.5 to 1.5 barrels per vertical foot of formation to be treated.

11. The method defined in claim 7 wherein the volume of spacing medium in each successive plugging treatment is substantially uniformly increased by an amount equivalent to the volume of spacing medium employed in the first treatment.

12. The method defined in claim 7 wherein the precipitate-forming reactants are sodium silicate and calcium chloride.

13. A method for recovering oil from heterogeneous oil-bearing formations penetrated by an injection well and a spaced production well, which comprises:
   performing a first permeability adjustment of the formation by injecting in sequence (1) aqueous sodium silicate solution, (2) an inert spacing medium, and (3) aqueous calcium chloride solution, the amount of said inert spacing medium being equivalent to 0.5 to 1.5 barrels per vertical foot of formation to be treated;
   injecting an aqueous flooding medium;
   interruping the injection of flooding medium and repeating the foregoing steps to obtain a plurality of permeability adjustments, the inert spacing medium being uniformly increased in volume in each successive treatment by an amount equivalent to the volume of spacing fluid injected in the first treatment so that the plugging precipitate is successively formed in regions of the formation increasingly further from the injection well;

continuing the injection of aqueous flooding medium; and recovering oil from said production well.